US010351258B1

(12) United States Patent
Barnes

(10) Patent No.: US 10,351,258 B1
(45) Date of Patent: Jul. 16, 2019

(54) SYSTEM FOR PROTECTING AIRCRAFT AGAINST BIRD STRIKES

(71) Applicant: Lumen International, Inc., Homestead, FL (US)

(72) Inventor: William J. Barnes, Miami, FL (US)

(73) Assignee: Lumen International, Inc., Homestead, FL (US)

( * ) Notice: Subject to any disclaimer, the term of this patent is extended or adjusted under 35 U.S.C. 154(b) by 0 days.

(21) Appl. No.: 15/852,146

(22) Filed: Dec. 22, 2017

Related U.S. Application Data

(63) Continuation-in-part of application No. 15/652,774, filed on Jul. 18, 2017, now abandoned.

(60) Provisional application No. 62/363,683, filed on Jul. 18, 2016.

(51) Int. Cl.
| | |
|---|---|
| *B64D 45/00* | (2006.01) |
| *B64D 33/02* | (2006.01) |
| *A01M 29/10* | (2011.01) |
| *G01V 8/20* | (2006.01) |
| *A01M 29/08* | (2011.01) |
| *G02B 5/08* | (2006.01) |

(52) U.S. Cl.
CPC .............. *B64D 45/00* (2013.01); *A01M 29/08* (2013.01); *A01M 29/10* (2013.01); *B64D 33/02* (2013.01); *G01V 8/20* (2013.01); *G02B 5/0891* (2013.01); *B64D 2033/022* (2013.01); *B64D 2045/0095* (2013.01)

(58) Field of Classification Search
CPC .............. B64D 33/02; B64D 2033/022; B64D 2045/0095; B64D 45/00; G02B 5/0891; A01M 29/08; A01M 29/10; G01V 8/20
See application file for complete search history.

(56) References Cited

U.S. PATENT DOCUMENTS

| | | |
|---|---|---|
| 4,736,907 A | 4/1988 | Steffen |
| 5,158,351 A | 10/1992 | Grundler |
| 5,307,194 A | 4/1994 | Hatton et al. |
| 5,774,088 A | 6/1998 | Kreithen |
| 6,758,586 B1 | 7/2004 | Wilhem et al. |
| 7,023,361 B1 | 4/2006 | Wallace et al. |
| 7,871,455 B1 | 1/2011 | Sands et al. |
| 8,052,767 B2 | 11/2011 | Sands et al. |
| 8,506,089 B2 | 8/2013 | Kayser |
| 8,727,286 B2 | 5/2014 | Silkey et al. |
| 2003/0101633 A1 | 6/2003 | Bhullar |
| 2009/0191208 A1 | 7/2009 | Salzman et al. |
| 2010/0098844 A1* | 4/2010 | Pettinger ............... A01M 29/08 427/164 |

(Continued)

*Primary Examiner* — Donald L Raleigh
(74) *Attorney, Agent, or Firm* — Malloy & Malloy, PL

(57) ABSTRACT

A system operative to protect aircraft and possibly other objects against bird strikes by mounting or disposing a protective components including protective lighting and protective reflective coating on the aircraft, wherein the protective coating is structured to enhance the visibility of the aircraft to birds. The protective lighting and or reflective coating is at least partially disposable in a predetermined location on the aircraft which is commonly observed. A controller is operative with said lighting assembly and configured to perform multi-mode capabilities operative to regulate illumination modes of the lighting assembly. The operative illumination modes are variable and at least partially dependent on a geographical location of the aircraft during flight.

14 Claims, 10 Drawing Sheets

(56) References Cited

U.S. PATENT DOCUMENTS

| | | | |
|---|---|---|---|
| 2010/0236497 A1* | 9/2010 | Philiben | A01K 11/008 |
| | | | 119/712 |
| 2011/0041474 A1* | 2/2011 | Gerez | B64D 45/00 |
| | | | 60/223 |
| 2011/0084292 A1 | 4/2011 | McDaniel, Jr. | |
| 2011/0109236 A1 | 5/2011 | Zhurin et al. | |
| 2011/0134397 A1 | 6/2011 | Kayser | |
| 2012/0113754 A1* | 5/2012 | Husseiny | H04R 27/00 |
| | | | 367/139 |
| 2012/0222611 A1 | 9/2012 | Yifrach | |
| 2013/0101417 A1 | 4/2013 | Cloninger, II et al. | |
| 2013/0180466 A1 | 7/2013 | Brown | |
| 2013/0298845 A1 | 11/2013 | Blanchard | |
| 2014/0157872 A1 | 6/2014 | Welland et al. | |
| 2015/0176491 A1 | 6/2015 | Alnafisah | |
| 2016/0029615 A1 | 2/2016 | Newcamp et al. | |
| 2018/0002034 A1* | 1/2018 | Khawam | B64D 47/06 |

\* cited by examiner

SYSTEM FOR PROTECTING AIRCRAFT AGAINST BIRD STRIKES

CLAIM OF PRIORITY

The present application is a Continuation-In-Part application of previously filed, now pending application having Ser. No. 15/652,774 which was filed on Jul. 18, 2017, claims priority pursuant to 35 U.S.C. Section 119(e) to a prior filed Provisional patent application, namely, that having Ser. No. 62/363,683, which was filed on Jul. 18, 2016, the contents of which are both incorporated herein by reference in their entireties.

BACKGROUND OF THE INVENTION

Field of the Invention

The present invention is directed to a system for preventing or at least significantly reducing the possibility of "bird strikes" with fixed wing aircraft, rotorcraft and possibly other structures, by enhancing the visibility of the aircraft to different species of birds. Bird visibility is increased, at least in part, by modifying the aircraft to include exterior lighting and/or coatings, that emit light in a spectral wavelength such as, but not limited to, ultraviolet (UV) light which is visible to most birds.

Description of the Related Art

During flight, aircraft and particularly, but not exclusively, jet engine aircraft associated with commercial carriers are susceptible to the ingestion of birds into the engine intake. Such ingestion can cause damage to the aircraft's engine, resulting in partial or complete loss of engine power. The risk of ingestion is highest during take-off and landing, when the aircraft is flying at low altitude, because the aircraft is more likely to encounter flocks of birds. The FAA's report titled Wildlife Strikes to Civil Aircraft in the United States, 1990-2015, states that aircraft engines were the component most frequently reported as being damaged by bird strikes from 1990 to 2015. The FAA report also shows that 11 out of the 12 wildlife strikes resulting in loss of life from 1990 to 2015 involved varying species of birds.

Accordingly, it has been well recognized the bird strikes with aircraft are a significant threat to flight safety and may cause significant damage to a fixed wing aircraft or a rotorcraft (helicopter). Current aircraft exterior lighting typically includes navigation lights comprising a red light mounted on the left side of the aircraft and a green light mounted on the right side of the aircraft. In addition, anti-collision beacons comprising high-intensity strobe lights are mounted on the wing tips, tail and/or fuselage of aircraft. This lighting is designed to signal the position of the aircraft, its heading and its status to both other pilots and ground crews. Statistical analysis of bird strikes indicates a pronounced bias toward striking one side of an aircraft over the other, which seems to indicate that the lighting on one side of the aircraft is "more visible" to birds than the other side and thereby avoided by approaching birds.

In general, the current or conventional lighting as well as the paint applied to an aircraft serve multiple purposes before, during and after flight. Color schemes and lighting not only help in aircraft identification, but also in increasing aircraft visibility to others. By increasing aircraft visibility to people, pilots in particular, aircraft collisions are more easily averted. Similarly, it is believed that by increasing aircraft visibility to birds, bird-aircraft collisions or "bird strikes" may be made less probable.

Increasing aircraft visibility to birds is becoming more crucial with the advent of quieter, modern turbofan engines being used in the aviation industry. In the state of Florida alone, 368 bird strikes were reported between the years 2003-2004; 432 bird strikes were reported between years 2008-2009; 670 bird strikes were reported between years 2011-2012 and 880 bird strikes were reported between years 2013-2014. Moreover, 92% of all bird strike events happened at an altitude below 3500 feet. This indicates that the greater percentage of bird strikes occurs primarily on flights during takeoff, climbing and assent or approach and landing. Bird strikes not only cause costly and dangerous power plant and structural damage, but also have been known to cause injury and death to aircraft occupants. Also, airlines incur additional expenses when flights are canceled or delayed, requiring hundreds of passenger re-bookings or overnight lodging.

Investigation has indicated that birds can see almost all of the light spectrum visible to humans as well as the addition of a substantial range in the ultraviolet (UV) wavelength spectrum. The ultraviolet light spectrum is divided, by wavelength, into 3 main subsections: UV-A, UV-B and UV-C. Both the UV-C, wavelength between 100 and 280 nanometers (nm) and UV-B, wavelength between 280-315 nm, are substantially absorbed by the Earth's atmosphere. However, UV-A, with a wavelength between 300-400 nm is used because UV light below this frequency is typically not visible to birds. In contrast, the vision of a human is limited to light in the wavelength range of approximately 400 to 700 nanometers (nm), a typical bird's vision extends from 300 to 630 nm, with significant variation in some species. The human eye is such that it enables humans to see light in the wavelengths of colors of red, green and blue. On the other hand, the eyes of birds enable them to see different shades of red, green and blue plus light in the ultraviolet range between 300-400 nm.

As set forth above, conventional paint and aircraft lighting devices are designed for optimal human visibility and detection but are not especially designed to facilitate being detected by birds. Because of this, existing paint on aircraft reflects light mostly in the visible light wavelength of 400 to 700 nm. Also for the same reason, aircraft lights in the form of incandescent bulbs, LEDs, lasers, etc. are not designed for optimum radiation of light in the ultraviolet wavelength region. By way of example, a variant of an approved "aviation red" lighting beacon emits light with a 640 to 660 nm wavelength, which is virtually invisible to many birds as this wavelength is just beyond a many bird's visible spectrum. This may account for a USDA/FAA 2014 bird strike report indicating that there are significantly more bird strikes on the left side of an aircraft, where the "aviation red" wing tip light is used, as set forth above. By not utilizing the full spectrum of a bird's sight capability, a bird is not able to optimize its detection and avoidance of aircraft and in order to minimize bird strikes.

Accordingly, in order to overcome the problems well recognized in the aviation industry and as generally set forth above, there is a need to make an aircraft more visible to birds by increasing the external appearance of an aircraft to be within the full spectrum of light of a bird's vision. In doing so, it would be desirable to apply coatings, such as paint, and/or lighting to an aircraft that reflects and/or emits ultraviolet light, rapid flicker, alternate color insertion, etc., thereby making the aircraft more visible to birds. Moreover, a preferred and proposed system for making an aircraft more visible to birds in an attempt to significantly reduce bird strikes, which include appropriate paint or other coatings and/or lighting to be applied as general coverage. In the alternative coatings, specialized paint and lighting may be applied and/or mounted on both fixed wing aircraft and a rotorcraft in a manner which highlight certain areas or structures of the aircraft that may be more vulnerable. Such modification or improved facilities added to aircraft would direct light forwardly of the aircraft and/or in a direction which would eliminate or substantially reduce the occurrence of a physical hit of a bird with the aircraft and would not interfere with existing aircraft lighting standards or requirements, as also generally set forth above.

SUMMARY OF THE INVENTION

The present invention is directed to a system utilizing unique protective lighting and exterior reflective coating such as, but not limited to, reflective paint enhancements operative, independently or in combination with the protective lighting to reduce bird strike events in any fixed wing aircraft or rotorcraft. Further, one or more preferred embodiments of the system of the present invention is operable to automatically change the aircraft's exterior protective lighting properties based on the aircraft's location, altitude, speed, phase of flight, etc. in an effort to make the aircraft more visible to birds, without requiring aircraft personnel to attend to such adjustments. Highly UV reflective coatings specifically including, but not limited to, exterior paint may be applied to various surfaces of the aircraft which may be more prone to bird strikes and/or which may be more visible to birds. Such highly reflective paint/coatings may be applied to the rotors of a helicopter or to leading edges of fixed wing aircraft, as well as to surfaces adjacent exterior protective lighting facilities.

Moreover, by utilizing a coating or paint that is optimized to reflect UV light within a wavelength visible to birds, including "UV-A" light, an aircraft's visibility to birds can be greatly enhanced. In addition, such coating or paint need not reflect visible colors to humans, while reflecting ultraviolet light. This facilitates the creating of designs on the exterior surface of an aircraft that deter the bird strikes, but do not interfere with conventional indicia on the aircraft. Such customized or created designs may include large shapes or features of a "natural predator". Therefore, when combined with UV reflective paint or coatings or other techniques such designs, because they are now clearly visible to birds, may succeed in protecting against bird strikes, while not impeding the conventional or intended color scheme or design pattern placed on aircraft which are visible to humans.

As will be explained in greater detail hereinafter, the system of the present invention may be implemented by modifying and/or replacing existing exterior lighting with new or modified protective lighting hardware that has multi-mode capabilities. Such multi-mode capabilities may include, but not be limited to, UV enhancements, variable programmable flickering of the protective lighting, high-speed color shifts and variable flash rates and patterns which are perceptible to birds but are not visible to humans. In addition, such multi-modal capabilities and the overall operational features of the various embodiments of the system of the present invention will maintain existing FAA exterior lighting requirements and standards. As also explained hereinafter the aforementioned multi-mode capabilities are important, due to the fact that different species of birds have different vision capabilities. Therefore, one setting of the modified protective lighting of a given aircraft may not be as effective to enhance the visibility of an aircraft to all species of birds.

Through extensive investigation it has been found that many times when birds collide with an aircraft they are approaching from the front and observe a frontal line of sight viewing of the aircraft. Such frontal line of sight approach includes a location of the approaching birds which is slightly above and forward of the aircraft. As such, the location of an approaching bird has been found to be typically within a substantially "conically shaped" area of (plus or minus) 10° of the frontal line of sight, direction of travel of the aircraft. Accordingly, one or more preferred embodiments of the system of the present invention may include modified or supplemental exterior protective lighting in the form of "eyebrow" lighting mounted on the exterior the aircraft immediately above the frontal portions of the cockpit area and/or windows of the cockpit. The "eyebrow" lighting would also have the aforementioned multi-mode capabilities.

As yet another example, the modified and improved protective lighting of the present invention may include a "Hawkeye" LED or other appropriate light having a paint scheme or other design format to simulate the closing and opening of a predator bird's eye lids. This is believed to have an effect to deter the bird from the area of the aircraft especially in the area of the "Hawkeye" lighting, which will also include multi-mode capabilities.

In addition, the modified protective lighting and/or UV reflective coating/paint exterior surfaces may include "rotor illumination", where in an LED or other appropriate UV and/or visible light source is disposed to illuminate the exposed surfaces of the rotors of a rotorcraft. In this additional preferred embodiment, the protective lighting will be reflected from the UV and/or visible light reflective paint/coating to make the rotors as well as other portions of the rotorcraft more visible to birds during its operation. As with other preferred embodiments, multi-mode capabilities of the modified protective lighting can be incorporated.

One or more preferred embodiments of the present invention may also comprise a programmable controller that includes an embedded Global Positioning System (GPS), or the equivalent, which determines the location, altitude and airspeed of the aircraft during flight. The programmable controller further includes or has access to a database and/or memory unit, having data stored thereon with known behaviors, characteristics and tendencies of different bird species which are common in different geographical regions. In use and by way of example only, a processor operatively associated with the controller receives the aircraft's current location and flight dynamics from the GPS. Based on the bird behavior, tendency, characteristics, etc. data stored in the memory unit or database associated with the controller, for a given geographical region in which the aircraft is currently located, the modified protective lighting facilities mounted on the aircraft are "automatically" adjusted to correspond to the behavioral data of a bird species common to the geographical region in which the aircraft is flying.

In addition, the controller can be manually programmed wirelessly via a "remote" desktop personal computer or handheld processor such as, but not limited to, a smart phone having an application implemented therein. Such manual programming can be accomplished before or during the flight of the aircraft in situations where an atypical bird threat is received from other pilots, bird detection systems, audible alerts, etc. Accordingly, when birds are detected, which are not typically located in a given geographical region in which the aircraft is flying, manual programming can be accomplished, wirelessly, in order to overcome and/or supplement the normal lighting program set for bird behavior typical for a given region in which the aircraft is flying. Manual control, in the manner indicated can also be used to regulate the operation of the controller at least for purposes of deactivating and cycling on or off any modified protective lighting facility as a group or individual protective lighting units correspondingly disposed on different predetermined portions of the aircraft.

In yet another embodiment, the controller may receive bird location data from an Automatic Dependent Surveillance Broadcast (ADS-B) or other appropriate network. The processor compares the stored bird pattern or updated bird activity received during flight from the notifying network (ADS-B) to the current flight dynamics of the aircraft and adjust the exterior, modified protective lighting appropriately, in real time.

By way of example only, an aircraft or rotorcraft such as, but not limited to, a medevac helicopter, picks up a patient at dusk near a shoreline for purposes of flying the patient to an inland hospital. In accord with one or more preferred embodiments of the system of the present invention, the exterior modified protective lighting assembly would operate at the optimum illumination state, including continuous lighting, flashing, flickering, and color patterns, as appropriate for bird species normally found in the region of the beach or shoreline. Upon reaching or approaching the inland hospital location, the protective exterior lights would be automatically switched or adjusted to the optimum illumination state for other types or categories of birds found in the inland area such as, but not limited to, pigeons or the like. Such adjustment, would occur automatically without the necessity of manual input from the pilot or aircraft personnel.

Moreover the structure of a birds eye makes their vision sensitive to "flickering" light at certain frequencies; namely, frequencies between 45 and 160 Hz. As used herein, "flickering" is defined as the electrical activating and subsequent deactivating of a light in a sequential and/or repetitive manner. Flickering may be performed with an analog, sinusoidal-type wave, but is more visibly conspicuous when performed with a digital, square-type wave demonstrated in a continuous or sweeping/oscillating rate. Varying the frequency or pattern of the flickering of the UV or other appropriate light being emitted from the protective lighting or protective reflective coating on the aircraft can be performed in a manner to optimize the visibility of the light to a particular bird species.

Further by way of example, a particular flicker pattern may be used by an aircraft flying in the Northwest United States, where the threat of bird strikes is predominantly caused by Canadian geese. In contrast, a different flicker pattern may be employed when the aircraft is flying in the Southeast United States, where egrets and pelicans cause the majority of bird strikes. Therefore, the protective lighting assembly and the individual one or more lighting units of the system of the present invention, as well as the protective reflective coating are preferably configured to emit or reflect UV light in a flickering illumination mode at frequencies between 45 and 160 Hz or at any other frequency determined to be effective in order to increase the visibility or visible profile of the aircraft.

In more specific terms, external lights mounted on the aircraft may include a combination of conventional and modified navigation lights and anti-collision beacons as well as customized or modified protective lighting strategically located to increase the visibility of the aircraft and or different parts thereof. For example, a modified external protective light, such as a red light, could employ an additional emitter in the UV range of about 385 nm in cooperation with conventional lighting operative in a visible range of generally about 645 nm. The multi-mode capabilities of the protective lighting of the system of the present invention allows the one or more individual protective lighting units to operate in a continuous or steady mode, a flicker mode, such as in the range of 45-200 Hz and a flash mode. The counter-bird modifications employed on a protective green external light could use the same or different techniques as employed on the protective red light.

Additionally the UV lighting can include high-speed color insert flashing at about 100 Hz with different colors such as blue lighting at about 480 nm approximately every 40 Hz. Other colors or color patterns can be utilized and be at least partially dependent on which color or color patterns are more visible to birds in general or a species of birds, dependent at least in part on geographical location, as set forth above. Further, the modified protective lighting assembly can increase brightness between normal and double intensities in two second cycles and can flash UV or other appropriate bird visible colors during intervals between the flashing of the conventional aviation red or white external strobe lights. In addition, the flash pattern between the aviation red or white pulses of an anti-collision strobe light can be UV alone or in combination with other bird visible colors and can operate based on a single square wave illumination pattern or a series of short pulses or patterns.

While the system of the present invention, as set forth in greater detail herein is described with primary application to fixed wing aircraft and/or rotorcraft, aspects of the system may also be employed in other practical situations and application to avoid bird strikes, with comparatively minor modification to the structural and operational features thereof. Such additional practical application areas include, but are not limited to, wind turbine rotors, such as that associated with a wind farm, high-speed trains, skyscrapers, powerlines, etc.

Moreover, the protective lighting assembly may be strategically disposed on an engine intake surface to increase the visibility of the engine's intake to birds flying within the airspace surrounding the aircraft. The increased visibility of the engine intake will help birds detect and avoid collisions with the aircraft's jet engine. The protective lighting assembly may include one or more light units structured to emit light in a spectral range, including a you the range of light, visible to birds.

The one or more light units may include LED, laser, or other appropriate light sources capable of emitting light in a spectral range visible to birds. In this additional preferred embodiment, the light units are preferably disposed on or within an engine intake surface in a manner which does not disrupt airflow into and through the engine intake. In one example, the light units may be machined or otherwise mounted into the interior surface of the intake nose cowling so as to be substantially flush with the inside face of the intake. In such a non-interrupted position, the one or more light units are disposed so as to not disrupt the airflow into the aircraft's engine. Further, as set forth above, the protective lighting assembly disposed on and within the engine intake surface is structurally and operatively distinguishable from conventional lighting associated with the aircraft.

The light unit or units may be configured to operate in a continuous illumination mode, flickering illumination mode, flashing illumination mode, and/or multi-illumination state.

The light emitted from the light units is channeled outwardly from the light unit or units in a predetermined pattern such as, but not limited to, preferably a "fan beam" configuration.

The system may further comprise a controller operatively connected to the protective lighting assembly capable of automatically changing the patterns and/or colors of light emitted by the light units based on the current flight characteristics of the aircraft. The current flight characteristics may include flight the current location of the aircraft during flight, the speed of the aircraft, and/or the current altitude of the aircraft during flight.

The light unit or units are disposed and structured to direct their emitted light in a predetermined pattern onto an interior surface of the engine intake. In one embodiment, the light unit or units may comprise lasers that are configured to emit fan beams, as set forth above. As used herein, a "fan beam" configuration is defined as a beam having a narrow or smaller beam width close to the light source, wherein the beam continuously expands or "widens" as it extends outwardly or away from the source. In addition, the light units may emit a fan beam within the engine intake that will reflect on one or more interior surfaces of the engine intake thereby increasing the visibility of the engine intake to birds. In addition, the light emitted in preferably the predetermined pattern renders at least a portion of the engine intake observable from a frontal line of sight approach to the aircraft.

Further, in one or more preferred embodiments, a UV light reflective coating or paint may be disposed on one or more surface areas within an interior of the engine intake. By way of example only, the UV light reflective coating may be disposed on a frontal face of an engine fan within the engine intake. The UV light reflective coating will enhance the light reflected within the engine intake to further optimize the visibility of the engine intake to birds.

Accordingly, the protective lighting assembly of one or more embodiments of the present invention may include a plurality of light units collectively disposed in a predetermined array on or at least partially within an interior surface of the engine intake. In such an operative position the array of lights are individually and collectively structured to generate emitted light in a predetermined pattern at least onto interior surfaces of the engine intake.

One or more additional embodiments of the present invention may also include a detector assembly including at least one sensor unit, but more practically, a plurality of sensor units mounted within the engine intake and structured to determine the existence of a foreign object passing into the engine intake. The one or more sensor units are disposed on an engine intake surface so as not to disrupt airflow into the aircraft's engine. In one example, the sensor units like the one or more light units described herein, may be machined or otherwise structured to be disposed at least partially into the interior surface of the engine intake. In such an intended operative position the one or more sensor units may be flush or otherwise appropriately configured with the inside surface of the engine intake so as to not disrupt the airflow into and through the engine intake.

The sensor unit or units are structured and configured to detect the presence of foreign objects ingested by the engine intake such as birds or other foreign material that the aircraft may encounter while in flight or taxiing. The sensor units may include laser, radar, microwave based or other appropriate sensors capable of detecting foreign objects that have been ingested into the engine intake.

The detector assembly further comprises alert capabilities structured to direct an alert to aircraft personnel upon detection of a foreign object by the sensor unit or units. The alert may in the form of an audible alarm, a visual alert, or any other appropriate alert capable of communicating to the aircraft personnel that a foreign object has been detected within the engine intake.

Further, a plurality of sensor units may be collectively disposed in a predetermined array on an interior surface of the engine intake and structured to detect the presence of foreign objects ingested by the engine intake. The sensor units are disposed on an engine intake surface so as not to disrupt airflow into the aircraft's engine.

In another embodiment the predetermined array of light units and the predetermined array of sensor units are disposed within the engine intake in non-interfering relation to air flow there through, and the predetermined array of sensor units is disposed in spaced, downstream relation to said predetermined array of light units.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented throughout the Figures, the present invention is directed to a system for preventing or significantly reducing the possibility of birds striking (bird strike) an aircraft, during flight. Moreover, the structural and operative features of the system includes one or more protective components, mounted on at least the exterior of the aircraft 100, which function to increase the visibility of the aircraft and/or specific portions thereof to birds of different species.

More specifically, at least one preferred embodiment of the present invention includes a lighting assembly generally indicated as 10 including at least one, but more practically a plurality of light units 12. In general, the lighting assembly 10 and more specifically each of the one or more light units 12 is structured to emit light which is visible to birds. As set forth in greater detail hereinafter, the emitted light may be generated in a particular or predetermined range of wavelengths which is specifically visible to birds and which may or may not be visible to humans. Accordingly, in at least one embodiment the emitted light comprises ultraviolet (UV) light and more specifically UV light having a spectral band in the UV-A range.

Figure 1:
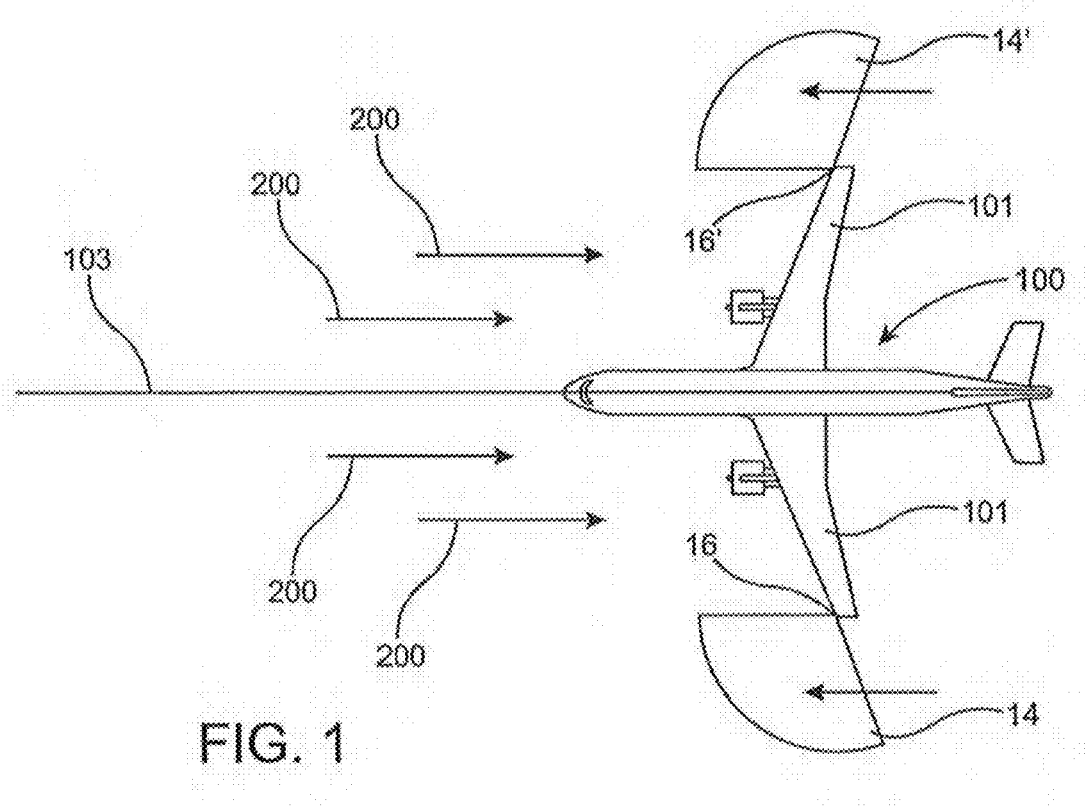
FIG. 1 is a top schematic view demonstrating operative and structural features of the system of the present invention.
Figure 2:
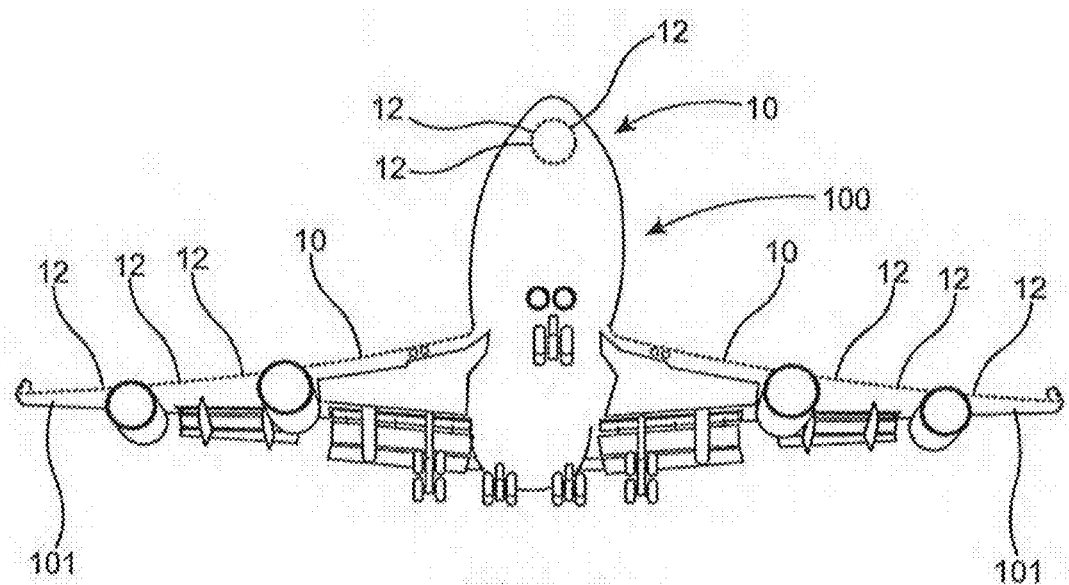
FIG. 2 is a front perspective view of an aircraft incorporating the various structural and operative features of the present invention.
Figure 2A:
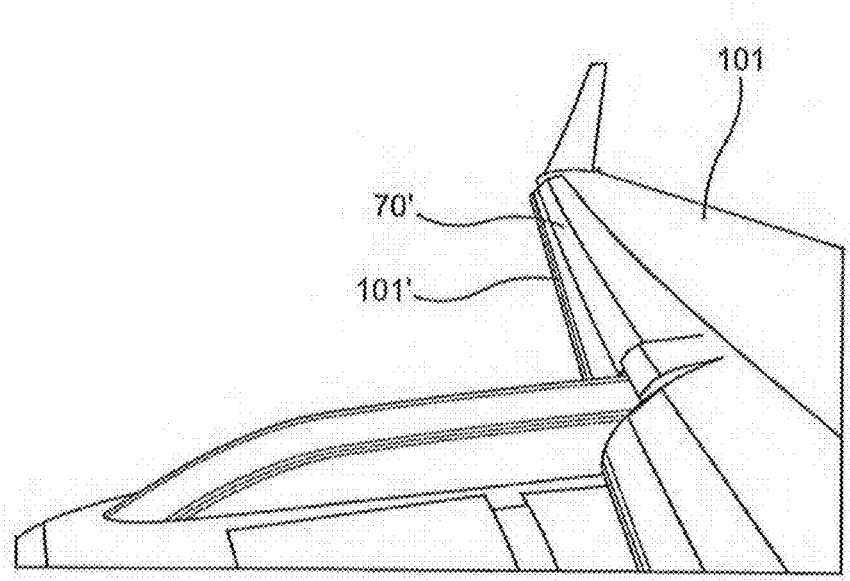
FIG. 2A is a perspective view in partial cutaway of a wing of an aircraft incorporating at least one protective embodiment of the present invention.

In addition to the protective lighting assembly 10 and the one or more protective light units 12, the system of the present invention further comprises the utilization of a protective component in the form of a reflective coating or paint 70, schematically represented in FIG. 2A. As such, one or more preferred embodiments of the system is directed to utilizing an exterior reflective coating 70 such as, but not limited to, reflective paint enhancements operative independently or in combination with the lighting assembly 10 to reduce bird strike events in any fixed wing aircraft or rotorcraft. Highly reflective UV or other coatings may be applied to various surfaces of the aircraft 100 such as, but not limited to, the leading edge 101' of the wings 101 of a fixed wing aircraft 100. Such leading edge 101' may be clearly exposed to approaching birds from the frontal line of sight approach 200 as represented in FIG. 1. As such, the leading edge 101' of the wing 101 of a fixed aircraft 100 may be more prone to bird strikes.

In addition, the system of the present invention may be implemented in other aircraft, including rotorcraft (helicopters). As such, highly reflective paint/coating 70 may be applied to the rotors of a helicopter. In addition, the modified protective lighting assembly 10 and/or UV reflective coating/paint 70 on exterior surfaces may include "rotor illumination", of a rotorcraft. As such, a UV or other frequency light generating LED or other appropriate UV light source being disposed in a location to efficiently illuminate the leading edge and/or other exposed surfaces of the rotors of a rotorcraft. In this additional preferred embodiment, the UV light emitted from the protective lighting assembly 10 may be reflected from the UV reflective paint/coating 70 to make the rotors as well as other portions of the rotorcraft more visible to birds during its flight. As with other preferred embodiments, multi-mode capabilities of the modified protective lighting can be incorporated.

Figure 1A:
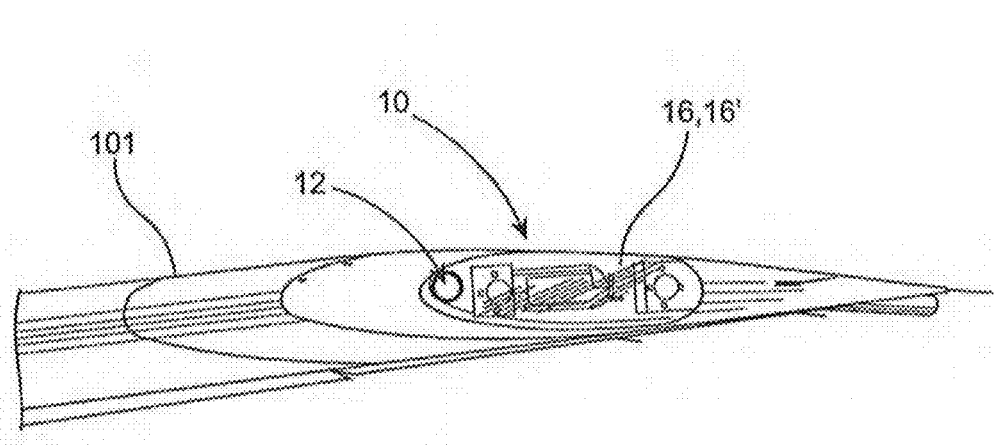
FIG. 1A is a perspective view in partial cutaway of an installation and disposition of at least one light unit associated with the protective lighting assembly of the present invention.
Figure 2B:
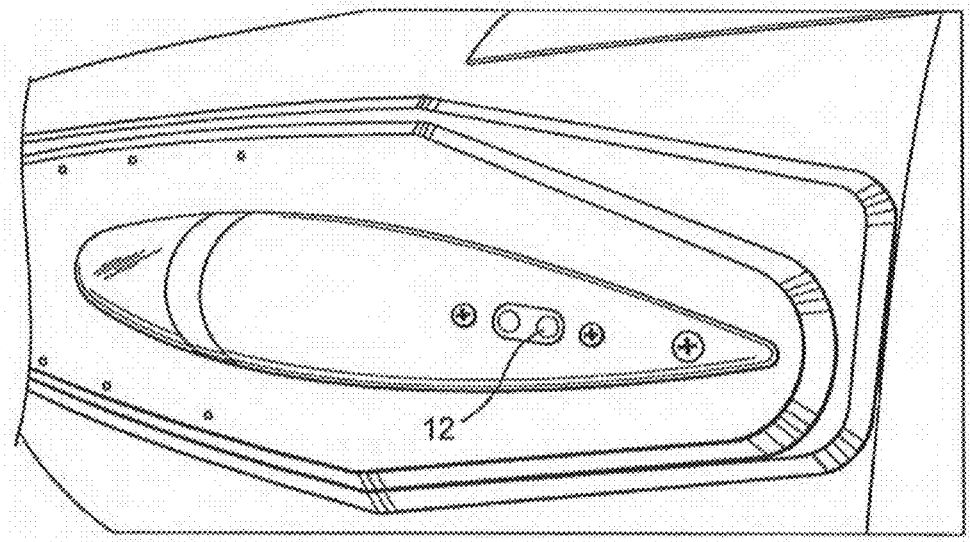
FIG. 2B is a side perspective view in partial cutaway representing structural modifications/installations of at least one light unit of the protective lighting assembly of the present invention.

As will be explained in greater detail hereinafter, the system of the present invention may be implemented by modifying and/or replacing existing exterior lighting, as represented in FIGS. 1A and 2B, with new or modified protective lighting hardware that has multi-mode capabilities. Such multi-mode capabilities may include, but not be limited to, UV enhancements, variable programmable flickering of the protective lighting assembly 10, high-speed color shifts and a variable flash rates and patterns which are perceptible to birds but are not necessarily visible to humans. It is to be note that combination of a variety of different protective lighting categories including, but not limited to, from UV through IR may be employed in the present invention. In addition, such multi-mode capabilities and the overall operational features of the various embodiments of the system and attendant protective lighting assembly 10 may be structured and operative to maintain existing FAA exterior lighting requirements and standards. As also explained hereinafter, the aforementioned multi-mode capabilities are important, due to the fact that different species of birds have different vision capabilities. Therefore, one setting of the modified protective lighting 10 of a given aircraft 100 may not be as effective to enhance the visibility of an aircraft 100 to all species of birds. Activation and implementation of the multi-mode capabilities of the protective lighting assembly 10 will be discussed in greater detail hereinafter with specific, but not exclusive, reference to a programmable controller 50 schematically represented in FIG. 6.

As represented in at least FIGS. 1, 2 and 3-5 the individual and/or one or more UV emitting light units 12 may be located on various portions of the aircraft 100 in an effort to render at least specific portions and occasionally the entire visual profile of the aircraft 100, more visible to birds. More specifically, as represented in FIG. 1, light patterns being emanated from the tips of the wings of the aircraft 100 are represented as 14 and 14' and in turn schematically represent the navigation lights on opposite sides of the aircraft. In conventional fashion, the light pattern 14 represents the red navigation light pattern, wherein the light pattern 14' represents the green navigation light. Moreover, as represented in FIG. 1A, at least one light unit 12 may be directly associated with each or at least one of the navigation lights 16, 16', so as to operate in cooperation there with. In the alternative, the UV emitting light unit 12, as part of the protective lighting assembly 10, may be independently structured so as to operate in a synchronous manner with the conventionally flashing navigation lights 16 and 16'.

In more specific terms, the one or more light units 12 may be activated to generate UV light from the tips or other portions of the aircraft 100 during the "off-phase" of the flashing or blinking lights. In contrast, during the "on-phase" of any of the flashing or blinking light, the normal red, green, etc. colored lights will be activated and displayed. It is emphasized that one or more light units 12 may be disposed at numerous locations throughout the exterior portions of the aircraft 100 and is specifically not limited to the aviation lights 16 and 16' located at the tips of the wing of the aircraft 100.

Figure 3:
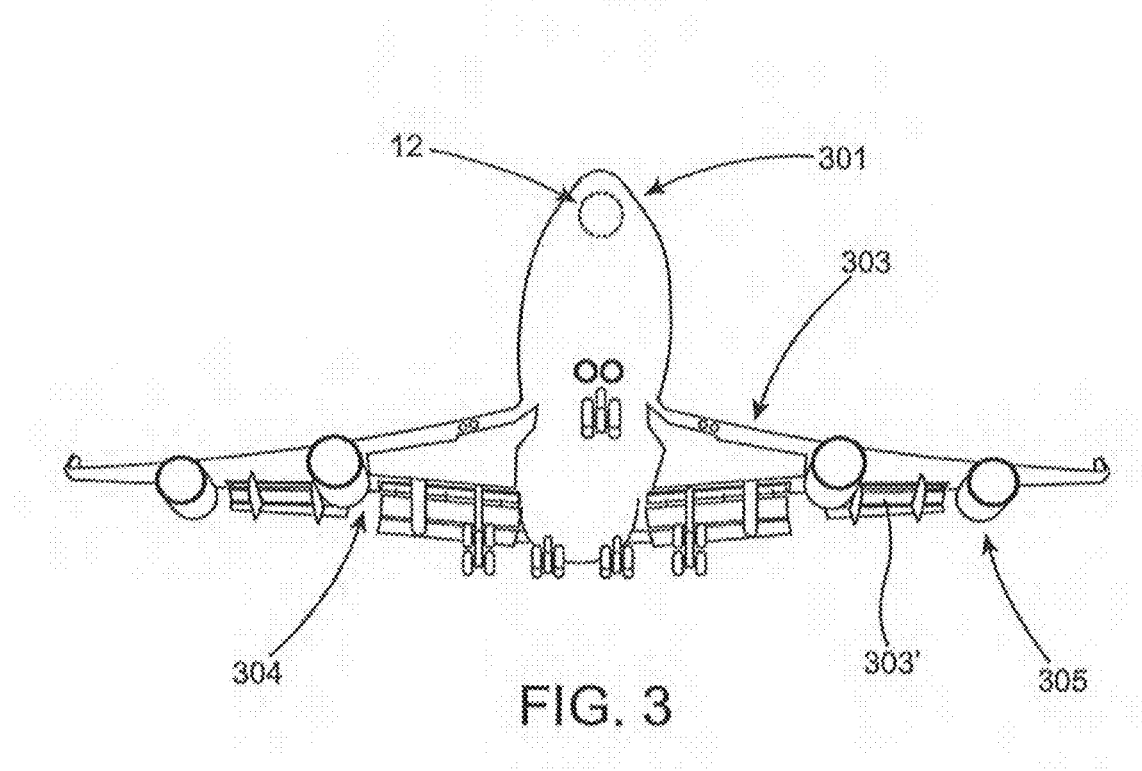
FIG. 3 is a perspective view of an aircraft, in-flight incorporating structural and operational features of the present invention.
Figure 5:
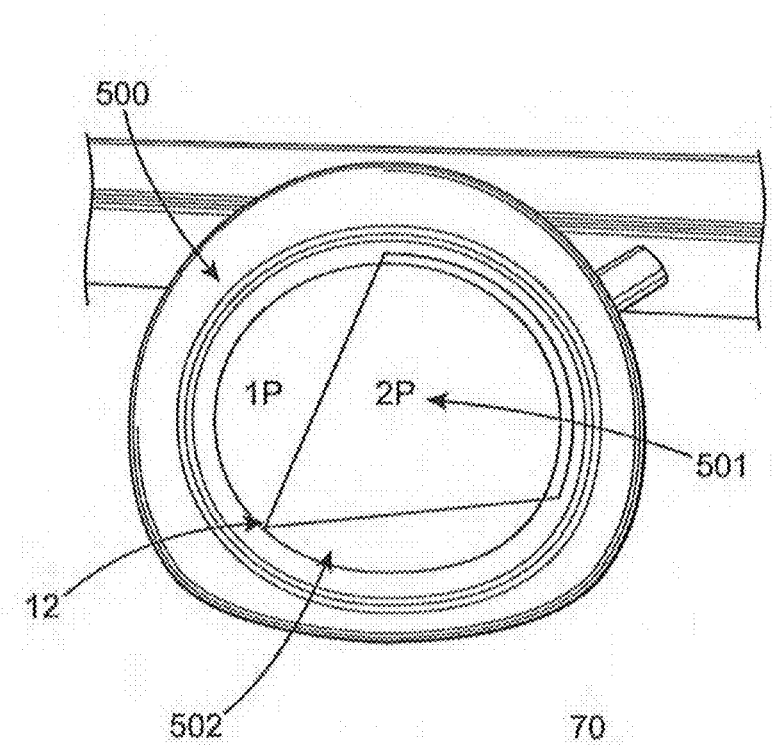
FIG. 5 is a front perspective view of an engine intake incorporating yet additional preferred embodiments of the present invention.

Such diversity is demonstrated in at least FIGS. 2, 3 and 5. With primary reference to FIG. 2, the protective lighting assembly 10, comprising a plurality of light units 12 may extend along at least a portion or substantially the entirety of the leading edge 101 of the wing of the aircraft 100. As also schematically represented FIG. 2, one or more light units 12 may be mounted on the directional and or landing light portion at the nose of the aircraft 100, such as at a location beneath the cockpit area.

FIG. 3 is directed to another preferred embodiment of the present invention wherein the protective lighting assembly 10 including one or more individual protective light units 12 are mounted at different portions of the exterior of the aircraft 100 and are operative to emit ultraviolet light therefrom. Accordingly, ultraviolet light may be emitted from one or more light units 12 emanated from the nose 301 of the aircraft 100; the front landing gear 302, a leading edge of the wing 303 or from the wing slats 303', bottom of the wing 304 or from engine cowling 305. Alternatively, smaller, less visible portions of the aircraft 100 such as, but not limited to, an antenna may be highlighted by or with emitted UV light in order to increase the visibility of the entire profile of the aircraft 100 or at least a frontal or corresponding portions thereof to approaching birds.

In determining the operative location of the protective lighting assembly 10, including each of the one or more protective light units 12, the direction of travel or approach of birds, relative to an aircraft 100, which results in a bird strike, should be kept in mind. As schematically represented in FIG. 1, extensive investigation indicates that many times when birds collide with an aircraft they are approaching from a substantially frontal line of sight approach 200, relative to the frontal portions of the aircraft 100. Such substantially frontal line of sight approach 200 is meant to further include a location of the approaching birds, which is slightly above and forward of the aircraft. As such, the location of an approaching bird has also been found to be within a "conically configured" area disposed substantially plus/minus 10° in front of the aircraft, relative to the direction of flight or travel.

Figure 4:
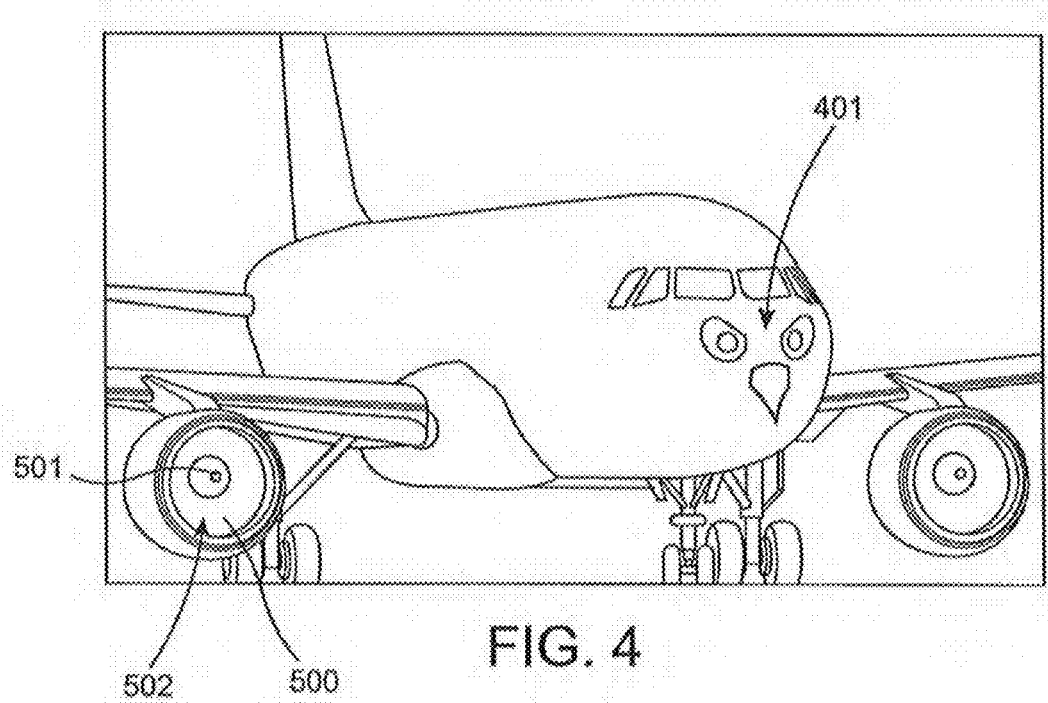
FIG. 4 is a front perspective view in partial cutaway of an aircraft incorporating yet additional preferred embodiments of the present invention.
Figure 4A:
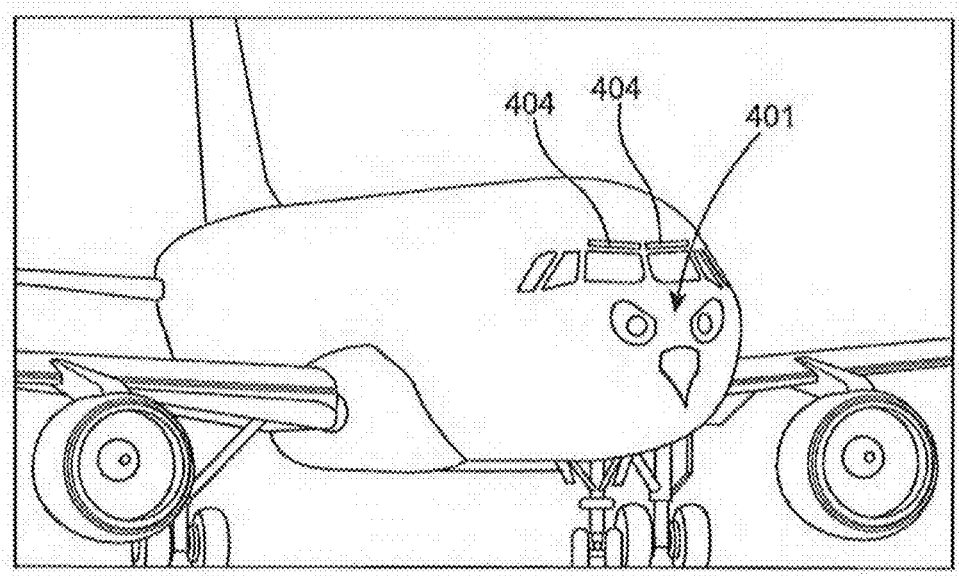
FIG. 4A is a front perspective view in partial cutaway, similar to the embodiment of FIG. 4, representing yet additional preferred embodiments of the lighting assembly of the present invention.

As represented in FIGS. 4 and 4A, additional embodiments of the system of the present invention may also be in the form of a design, pictorial representation, or other indicia generally indicated as 401. The purpose of such indicia, in whatever form, is to at least partially depict a natural predator of birds by effectively resembling a portion of such a natural predator such as a face, eye ("Hawkeye"), etc., thereby further having the effect of deterring birds from the vicinity. In addition, the "Hawkeye" portion of such predator indicia or representation may be used in combination with one or more light units 12 which, due to the multi-mode capabilities of the protective lighting assembly 10 may emit UV and other light, including visual light, in a "flickering" illumination mode. This may further enhance the reality of a predator to approaching birds, as well as increase the visibility thereof. Further, in order to enhance the protective properties of such indicia 401, it may be formed, at least in part, from ultraviolet or other appropriate wavelength reflective coating or paint 70, described in greater detail herein. Further, the representative indicia, pictorial representation, etc. 401 may be used independently of or in combination with one or more light units 12 associated with the protective lighting assembly 10.

Moreover the structure of a birds eye makes their vision sensitive to "flickering" light at certain frequencies; namely, frequencies between 2 and 160 Hz. As used herein, "flickering" is defined as the electrical activating and subsequent deactivating of a light in a sequential manner. Flickering may be performed with an analog, sinusoidal-type wave, but is more visibly conspicuous when performed with a digital, square-type wave demonstrated in a continuous or sweeping/oscillating rate. Varying the frequency or pattern of the flickering of the UV or other appropriate light being emitted from the protective lighting assembly 10 or protective reflective coating on the aircraft 100 can be performed in a manner to optimize the visibility of the light to a particular bird species.

With reference to FIG. 4A and considered independently or in combination with the embodiment of FIG. 4, one or more preferred embodiments of the system of the present invention may include a plurality of light units 12 being disposed and structured in the form of "eyebrow" lighting 404. As indicated, the "eyebrow" lighting 404 is mounted on the exterior the aircraft 100 and is adjacent to and/or immediately above the frontal portions of the cockpit area and/or windows of the cockpit. The "eyebrow" lighting 404 would also have the aforementioned multi-mode capabilities.

Accordingly, the embodiments of at least FIGS. 3, 4 and 4A are operative to emanate ultraviolet light or other light ranges in the aforementioned multi-mode capability including, but not limited to, a pulsating or flickering manner. As set forth herein, the pulsating or flickering illumination mode may occur at preferred frequency of between 2 and 160 Hz.

As represented in the embodiment of FIG. 5, embodiments of the system of the present invention may also be in the form of UV or possibility visual emitting light units 12 in the form of LEDs, lasers, etc. that project ultraviolet light onto a UV-reflective surface 70 of the aircraft. FIG. 5 represents a plurality of UV and/or visual lighting units or in the alternative a single lighting unit 12 disposed to emit UV light, represented in light patterns "1P" and "2P" into different portions of the interior of a engine intake 500. Components of the engine intake 500, such as a cone 501 or engine fan blades 502 may reflect the UV light projected onto the surface by virtue of having UV reflective coating or paint 70 thereon. This will have the effect of illuminating the engine intake 500 within the ultraviolet spectrum. Visible components within the engine intake 500 such as, but not limited to the cone 501 or engine/turbine fan blades 502 may also be covered with the aforementioned protective reflective coating or paint 70 to further optimize the amount of ultraviolet light reflected or emitted therefrom, when the ultraviolet light is directed thereon.

Figure 6:
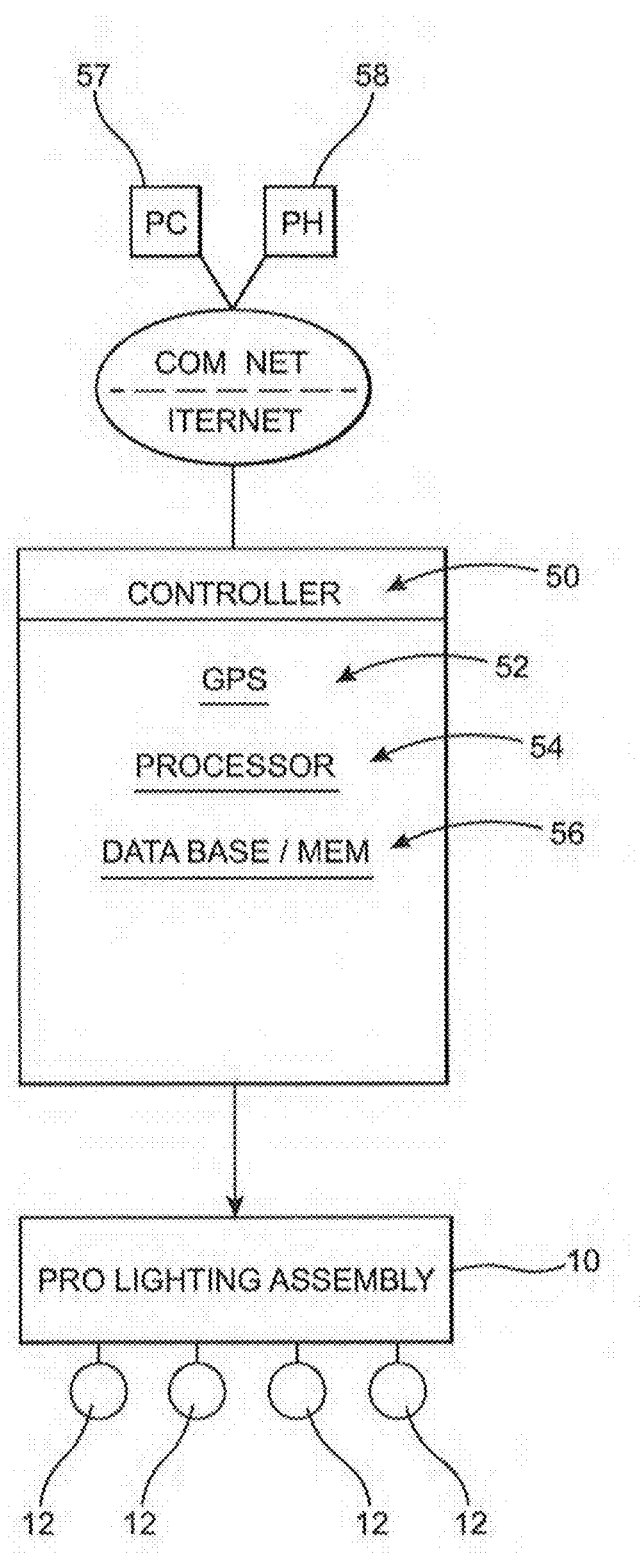
FIG. 6 is a schematic representation in block diagram form of a programmable controller operative to regulate multi-mode capabilities and other operational features of the protective lighting assembly of the present invention.

As represented in FIG. 6, one or more preferred embodiments of the present invention may also comprise a programmable controller 50 that includes an embedded or operatively associated Global Positioning System (GPS) 52, or the equivalent, which determines the real time location, altitude and airspeed of the aircraft 100 during flight. The programmable controller 50 further includes or has operative access to a processor 54, and a database and/or memory unit 56. The database/memory 56 includes data stored thereon with known bird behaviors, characteristics and tendencies of different bird species which are common in different geographical regions. In use and by way of example only, the processor 56, being operatively associated with the controller 50 receives the aircraft's current location and flight dynamics from the GPS 52. Based on the bird behavior, tendency, characteristics, etc. data stored in the memory unit or database 56 associated with the controller 50, for a given geographical region in which the aircraft 100 is currently located, the modified protective lighting assembly 10 and or one or more light units 12 mounted on the aircraft are "automatically" adjusted to correspond to the behavioral data of a bird species common to the geographical region in which the aircraft 100 is flying. Such adjustment may also take into consideration and/or accommodate other factors including, but not limited to, date, time of day, altitude, etc.

In addition, the controller 50 can be manually programmed wirelessly, by means of one or more communication networks 59 including, but not limited to, the Internet. Such wireless, manual programming can be accomplished by one or more "remote" desktop personal computers 57 and/or handheld processors 58 such as, but not limited to, a smart phone having an appropriate mobile application implemented therein. As used herein, the term "remote" is meant to indicate that the processor 57, 59, etc. is not necessarily integrated into the controller 50 itself. However the "remote" designation of the manual processors 57, 58, etc. may include such processors being located within or in adjacent relation to the aircraft 100. Such manual programming can be accomplished before or during the flight of the aircraft 100 in situations where an atypical bird threat is received from other pilots, bird detection systems, audible alerts, etc. Accordingly, when birds are detected, which are not typically located in a given geographical region in which the aircraft 100 is flying, manual programming can be accomplished, wirelessly, in order to overcome and/or supplement the normal or current program set for bird behavior typical for a given region in which the aircraft 100 is flying. Manual control, in the manner indicated can also be used to regulate the operation of the controller 50 at least for purposes of deactivating and cycling, on or off, the protective lighting assembly 10, in its entirety or individual protective lighting units 12 correspondingly disposed on different predetermined portions of the aircraft 100. In addition, automatic control, including deactivation of certain lighting may occur a designated or predetermined slower speeds.

In yet another embodiment, the controller may receive bird location data from an Automatic Dependent Surveillance Broadcast (ADS-B) or other appropriate network. The processor 50 compares the stored bird pattern or updated bird activity received during flight from the notifying network (ADS-B) to the current flight dynamics of the aircraft 100 and adjusts the exterior, modified protective lighting assembly 10 appropriately, in real time.

By way of example only, an aircraft or rotorcraft such as, but not limited to, a medevac helicopter, picks up a patient at dusk near a shoreline for purposes of flying the patient to an inland hospital. In accord with one or more preferred embodiments of the system of the present invention, the exterior protective lighting assembly 10 would automatically operate at the optimum illumination mode associated with the multi-mode capability of the system. Therefore, an optimum illumination mode may include a continuous lighting illumination mode, flashing illumination mode and/or a flickering illumination mode, as described in greater detail herein. The multi-mode capabilities of the present system may also include a variety of different color patterns, as appropriate for visualization by a bird species, normally found in the region of the beach or shoreline. Upon reaching or approaching the inland hospital location, the one or more exterior light units 12 would be "automatically" switched or adjusted to the optimum illumination state for other types or categories of birds found in the inland area such as, but not limited to, pigeons or the like. Such adjustment, would occur automatically without the necessity of manual input from the pilot or aircraft personnel.

Further by way of example, a particular flicker pattern may be used by an aircraft 100 flying in the Northwest United States, where the threat of bird strikes is predominantly caused by Canadian geese. In contrast, a different flicker pattern may be employed when the aircraft 100 is flying in the southeast United States, where egrets and pelicans cause the majority of bird strikes. Therefore, the protective lighting assembly 10 and the individual one or more lighting units 12 of the system of the present invention, as well as the protective reflective coating 70 are configured to emit UV light in a flickering illumination mode at frequencies between 2 and 160 Hz in order to increase the visibility or visible profile of the aircraft.

Yet another embodiment of the present invention is represented in FIGS. 7-10 and includes a protective lighting assembly 10' strategically disposed on an interior surface 701 of and engine intake 500. As explained in greater detail hereinafter, the protective lighting assembly 10' is disposed and structured to increase the visibility of the engine of the aircraft 100 and in particular the aircraft engine intake 500 to birds.

Moreover, the protective lighting assembly 10' of the embodiment of FIGS. 7-10 is preferably mounted on the interior surface 701 of an engine intake 500 and may include may include one or more light units 12'. Each of the one or more light units 12' are independently and collectively structured to emit light in a spectral range visible to birds. The emitted light may be generated in a particular or predetermined range of wavelengths which is specifically visible to birds and which may or may not be visible to humans. The spectral range may comprise ultraviolet (UV) light and more specifically UV light having a spectral band in the UV-A range. For optimal detection by birds, color wave lengths between 330 to 480 nanometers are recommended. The light unit or units 12 may include LED, laser, or other appropriate light sources capable of emitting light in a spectral range visible to birds. Lasers of any visible color or UVA invisible color may be used.

Figure 8:
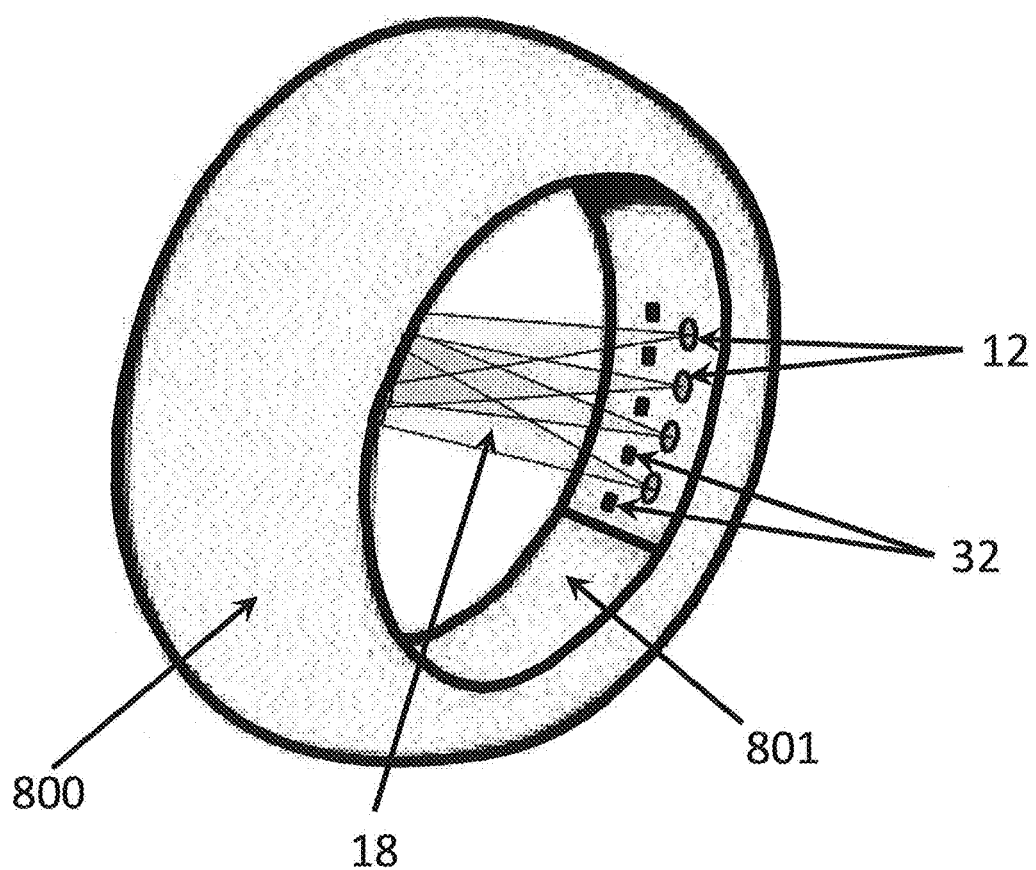
FIG. 8 is a front perspective view of the engine intake nose cowling incorporating the protective lighting assembly and the detector assembly.

The one or more light units 12' are disposed on the interior surface 701 of an engine intake 500 in a manner which does not disrupt airflow into the aircraft's engine. As represented in FIG. 8, each of the one or more light units 12' may be machined or otherwise mounted in at least a partially recessed orientation into the interior surface 801 of a nose cowling 800 of the engine intake engine. Such a recessed a mounting will dispose the one or more light units 12' in a substantially flush relation to the inside surface 801 of the intake cowling 800. Accordingly, the substantially flush or at least minimally recessed or other mounting configuration is established so as to be non-interruptive with the airflow passing through and into the cowling 800 of the aircraft engine. The placement of the protective lighting assembly 10'. Therefore, as should be apparent, the mounting on or structuring with the one or more light units 12' on and or within the intake nose cowling 800, in the manner described, allows the protective lighting assembly 10' to be adapted to any type of engine already on the market or in use. More specifically, the intake nose cowling 800 can be easily replaced for one containing the protective lighting assembly 10' without needing to extensively modify or replace the aircraft's existing engine.

The protective lighting assembly 10' disposed on the interior surface 701 of the engine intake 500 may be considered structurally and operatively distinguishable from conventional lighting associated with the aircraft 100. Moreover, the protective lighting assembly 10' will not interfere with any aircraft exterior lighting systems such as navigation lights and anti-collision lights. The strategic placement of the light units within the engine intake 500 makes them easily discernable from conventional lights. Further, the ability to operate the one or more light units 12' at wavelengths invisible to the human eye, yet visible to birds, allows the aircraft 100 to maintain its original external appearance and compliance with aircraft external lighting regulations.

The light unit or units 12' may be configured to operate in a continuous illumination mode, flickering illumination mode, flashing illumination mode, and/or multi-illumination state. The light emitted from the light unit or units 12' is channeled outwardly from the light unit or units 12 in a predetermined pattern to increase the visibility of the engine intake 500 to birds. The various illumination mode capabilities are important, due to the fact that different species of birds have different vision capabilities and may respond differently to different illumination patterns or color changes.

The one or more additional embodiments of FIGS. 7-10, including the protective lighting assembly 10', are also operatives utilizing the controller 50 and controlling components, as represented in FIG. 6. More specifically, the controller 50 is operatively connected to the protective lighting assembly 10' and is capable of automatically changing the patterns and/or colors of light emitted by the light units 12' based on the current flight characteristics of the aircraft 100. The current flight characteristics may include flight data such as the current location of the aircraft 100 during flight, the speed of the aircraft 100, and/or the current altitude of the aircraft 100 during flight. The protective lighting assembly 10' may also take into account the date and time of day to adjust the protective lighting assembly 10' based on the different migration patterns of the bird species that inhabit the region over/through which the aircraft 100 may be flying. The controller 50 may then select the optimum light colors and patterns based on the aircraft's location and the characteristics of the most common bird species in the area.

Figure 9:
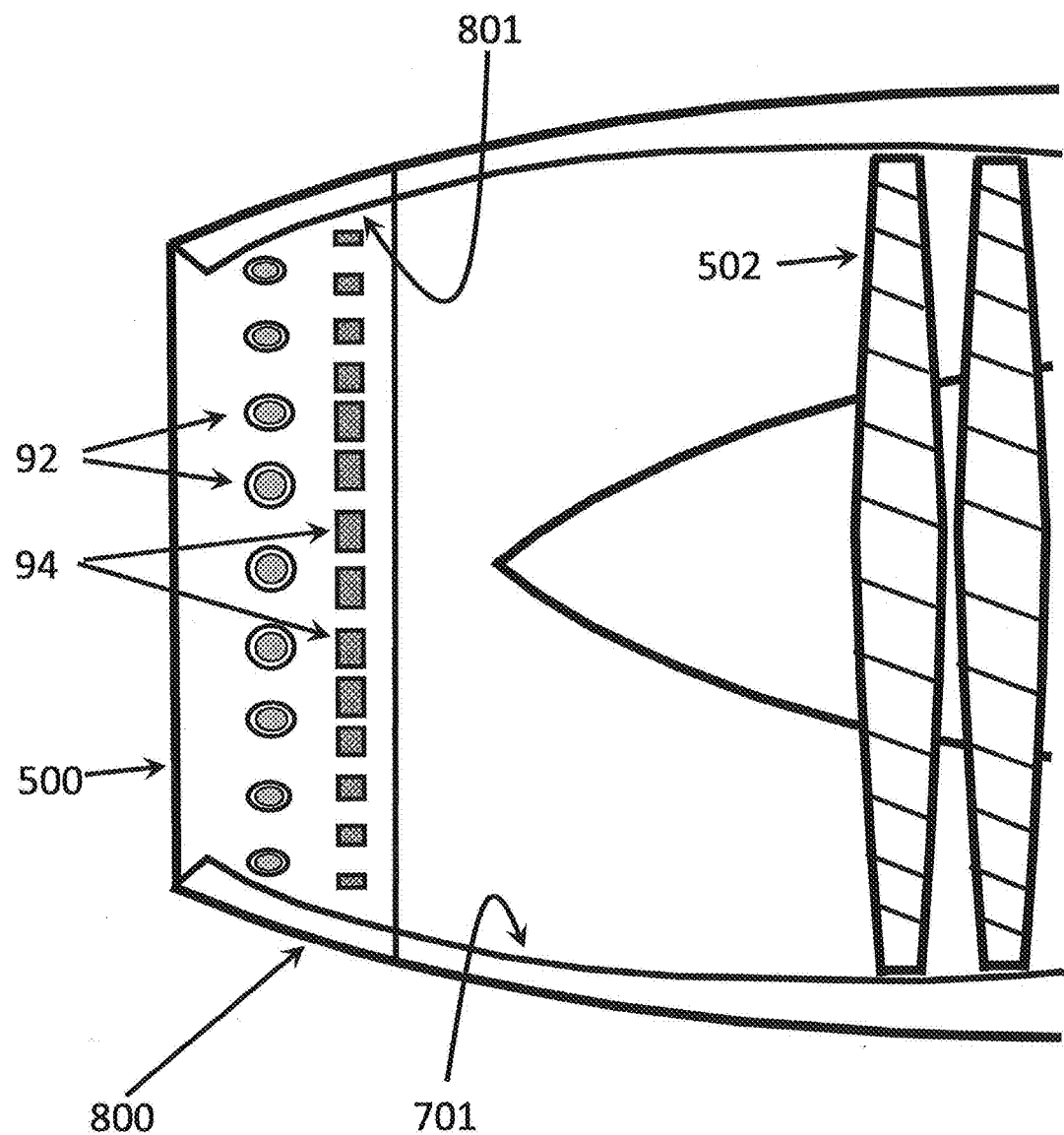
FIG. 9 is a side section view of the engine intake representing how the light emitted from the light units is reflected within the engine intake.

The light unit or units 12' are disposed and structured to direct their emitted light in a preferred predetermined pattern onto an interior surface 701 of the engine intake 500. In one embodiment as represented in FIG. 8, the light unit or units 12' may comprise lasers that are configured to emit "fan beams" 18. As used herein, "fan beam" is defined as a beam having a smaller more narrow beam configuration towards the light source 12' and a continuously enlarging or widening beam configuration as the light beam extends outwardly or away from the light source 12'. The light units 12 will emit a fan beam 18 within and in some operable instances onto interior surface areas 701 of the engine intake 500. As represented in FIG. 9, the emitted laser energy or other light beam is repeatedly reflected and diffused onto different portions of the interior surface areas 701, thereby further making the engine highly visible to birds, especially when viewing from a frontal direction of sight. The light emitted in a predetermined pattern renders at least a portion of the interior of the engine intake 500, and or cowling 800, observable from a frontal line of sight approach to the aircraft 100. The fan beam 18 divergence angle and the number of light units 12 may vary with intake 500 and/or cowling 800 size and design.

In a preferred embodiment as represented in FIG. 9, a UV light reflective paint or other type coating 70 is disposed on one or more interior surface areas of the engine intake 500. For example, the UV light reflective coating 70 may be disposed on a frontal surface of the engine fan 502 operatively disposed within the engine intake 500. The UV light reflective coating 70 will enhance the light reflected within the engine intake 500 to optimize the visibility of the engine intake 500 to birds.

Figure 7:
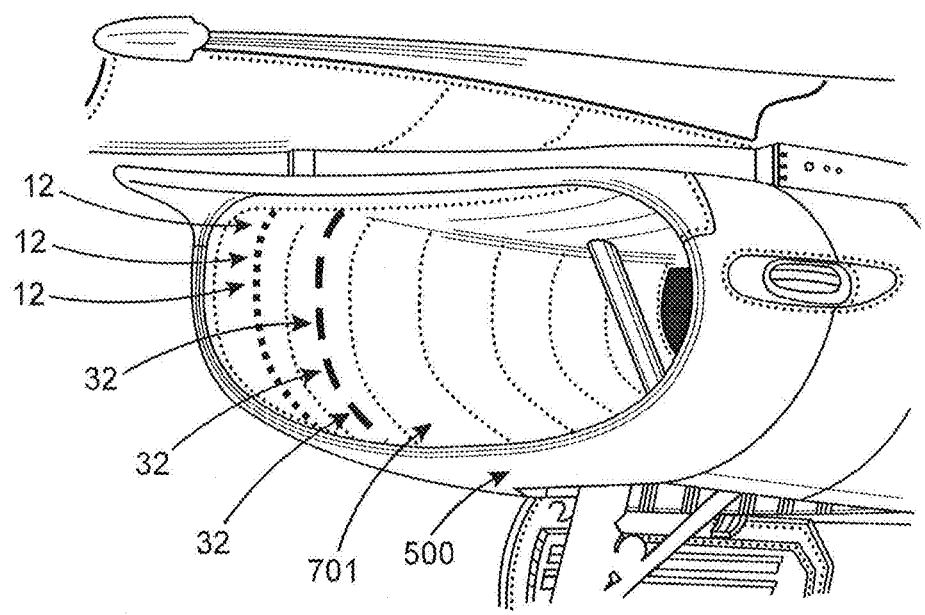
FIG. 7 is a front perspective view of the protective lighting assembly and detector assembly disposed on the engine intake of an aircraft without externally mounted engines.

As represented in FIGS. 7, 8, and 9, a plurality of light units 12' may be collectively disposed in a predetermined array 92 on an interior surface 701 of the engine intake 500 and or on the interior surface 801 of the intake cowling 800 of the aircraft. As such, the predetermined array 92 of the plurality of light units 12' are independently and collectively structured to generate emitted light in a predetermined pattern at least onto interior surfaces 701 of the engine intake 500 as well as the interior surface 801 of the cowling 800. The light units 12, as indicated, the array 92 of light units 12' are mounted on the corresponding interior surfaces 701, 801 in a flash or at least partially recessed configuration so as not to disrupt airflow into the aircraft's engine. The spacing of the plurality of light units 12' in the light unit array 92 may vary based on intake size, number of light units 12 and array design.

As also represented in FIGS. 7, 8, and 9, one or more additional embodiments of the system may include a detector assembly 30 including at least one sensor unit 32 mounted within the engine intake 500 on the interior surface 701. As such, the one or more sensor units 32 are structured to determine the existence of a foreign object passing into and at least partially through the engine intake 500 and or engine cowling 800. As with the plurality of light units 12', the sensor units 32 are disposed on an interior surface 701 of the engine intake 500 and/or interior surface 801 of the cowling 800 so as not to disrupt airflow into the aircraft's engine. In one example as represented in FIG. 8, the sensor units 32 may be machined into the interior surface 801 of the intake nose cowling 800 so as to be recessed, substantially flush or be mounted to a assume another configuration with the corresponding interior surfaces so as not to disrupt the airflow into the aircraft's engine. The placement of the detector assembly 30 on the intake nose cowling 800 allows the detector assembly 30 to be adapted to any type of engine, used in combination with a nose calling, already on the market or in use. The intake nose cowling 800 can be easily replaced for one containing the detector assembly 30 without needing to extensively modify or replace the aircraft's existing jet engine.

The sensor unit or units 32 are structured and configured to detect the presence of foreign objects ingested by the engine intake 500 and/or through the nose cowling 800 such as birds or other foreign material that the aircraft 100 may encounter while in flight or taxiing. The sensor units 32 may include laser, radar, microwave, or other appropriate sensors 32 capable of detecting foreign objects that have been ingested into the engine intake 500.

The detector assembly 30 further comprises alert capabilities structured to direct an alert to aircraft personnel upon detection of a foreign object by the sensor unit or units 32. The alert may in the form of an audible alarm, a visual alert, or any other appropriate alert capable of communicating to the aircraft personnel that a foreign object has been detected within the engine intake 500.

As also represented in FIGS. 7, 8, and 9, a plurality of sensor units 32 may be collectively disposed in a predetermined array 94 on an interior surface 701 of the engine intake 500 and/or interior surface 801 of the cowling 800. In such an operative position the plurality of sensor units 32 may be structured to detect the presence of foreign objects ingested by the engine intake 500, such as through the cowling 800. Moreover, the predetermined array of light units 92 and the predetermined array of sensor units 94 may be used in combination with one another and as such may be may be collectively disposed within the engine intake 500 and/or cowling 800 in non-interfering relation to air flow there through. Further, the predetermined array of sensor units 94 may be disposed in spaced, downstream relation to said predetermined array of light units 92 such that both the array of sensor units 94 and the array of light units 92 may operate without interference from one another.

As represented in FIG. 7, the protective lighting assembly 10 and the detector assembly 30 may also be installed on the intakes of aircraft without externally mounted engines. The light units 12 and sensors 32 are mounted on the intake walls of the aircraft 100, similar those in exteriorly mounted jet engine aircraft.

Figure 10:
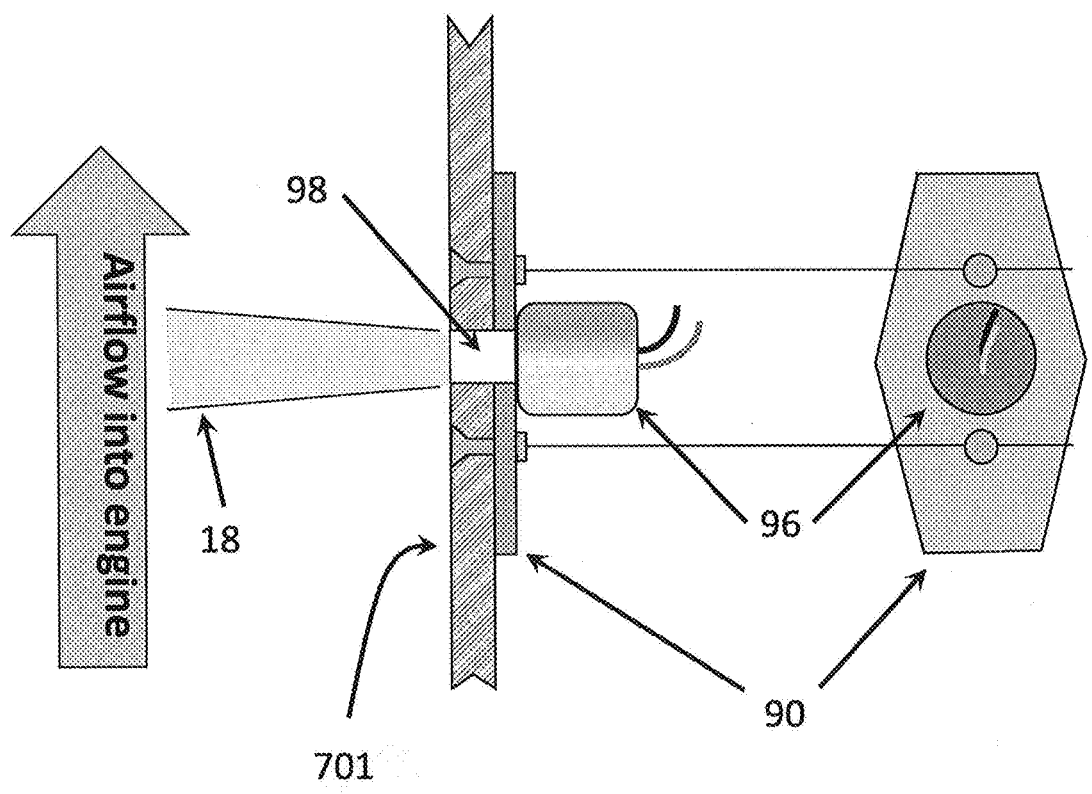
FIG. 10 is a side section view and a top view of a possible mounting technique for mounting the light units of the protective lighting assembly or the sensor units of the detector assembly onto the engine intake.

Furthermore, there are many possible ways of mounting the light units 12 or sensor units 32 onto the engine intake surface 500. In one embodiment as shown in FIG. 10, the light unit 12 or sensor unit 32 is mounted on the engine intake surface using a mounting plate 90 that is fixed onto the surface of the engine intake 500 using fasteners. An opening is machined on the engine intake surface 500 to accommodate the light unit 12 or sensor unit 32. The light unit 12 or sensor unit 32 is attached onto the mounting plate 90 and is positioned so that the light unit 12 or sensor unit 32 is exposed to the air flow entering the engine and is flush with the interior engine intake surface 500.

More specifically, FIG. 10 depicts one of many possible ways of mounting a laser light unit onto the surface of the engine intake 500. In this embodiment, a laser diode 96 is attached to a mounting plate 90 which is then fixed onto the engine intake surface 500 using fasteners. An opening is machined on the engine intake surface 500 to accommodate the laser lens assembly 98. The laser diode 96 is mounted on the engine intake surface 500 so that it is aligned with the lens assembly 98 in order to allow the laser to emit laser fan beams 18 towards the interior of the engine intake 500.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for protection of an aircraft against bird strikes, said system comprising:
a protective lighting assembly including at least one light unit structured to emit light in a spectral range visible to birds,
said at least one light unit mounted within an engine intake of the aircraft in non-interruptive relation to airflow through the engine intake,
said emitted light channeled outwardly from said at least one light unit in a predetermined pattern,
said predetermined pattern disposed to render at least a portion of the engine intake observable from a frontal line of sight approach to the aircraft,
said protective lighting assembly configured for operation in a multi-mode illumination state comprising variations in said emitted light at least partially dependent on current flight characteristics of the aircraft,
said current flight characteristics comprising a current location of the aircraft during flight, and
said at least one light unit is structured to automatically correspond to behavioral data of bird species common to the geographical region in which the aircraft is flying.

2. The system as recited in claim 1 wherein said spectral range comprises a UV range of light visible to birds.

3. The system as recited in claim 2 wherein said at least one light unit comprises a laser.

4. The system as recited in claim 1 wherein said at least one light unit is configured for operation in a continuous illumination mode.

5. The system as recited in claim 1 wherein said at least one light unit is configured for operation in a flickering illumination mode.

6. The system as recited in claim 1 wherein said at least one light unit is configured for operation in a flashing illumination mode.

7. The system as recited in claim 1 wherein said at least one light unit is disposed and structured to direct said emitted light in said predetermined pattern onto an interior surface of the engine intake.

8. The system as recited in claim 7 wherein said predetermined pattern of said emitted light comprises a fan beam.

9. The system as recited in claim 7 further comprising a UV light reflective coating disposed on at least one surface area within an interior of the engine intake.

10. The system as recited in claim 9 wherein said UV light reflective coating is disposed on a frontal face of a fan within the engine intake.

11. The system as recited in claim 1 further comprising a detector assembly including a plurality of sensor units mounted within the engine intake in non-interfering relation to airflow there through, said plurality of sensor units structured to determine the existence of a foreign object passing into the engine intake.

12. The system as recited in claim 11 wherein said detector assembly further comprises alert capabilities structured to direct an alert to aircraft personnel upon detection of a foreign object by said plurality of sensor units.

13. The system as recited in claim 1 wherein said current flight characteristics comprise a current altitude of the aircraft during flight.

14. The system as recited in claim 1 further comprising a controller operatively connected to said protective lighting assembly, said controller structured to determine an operation mode of said at least one light unit through a multi-mode illumination state, dependent on current flight characteristics of the aircraft.

* * * * *